Patented June 10, 1941

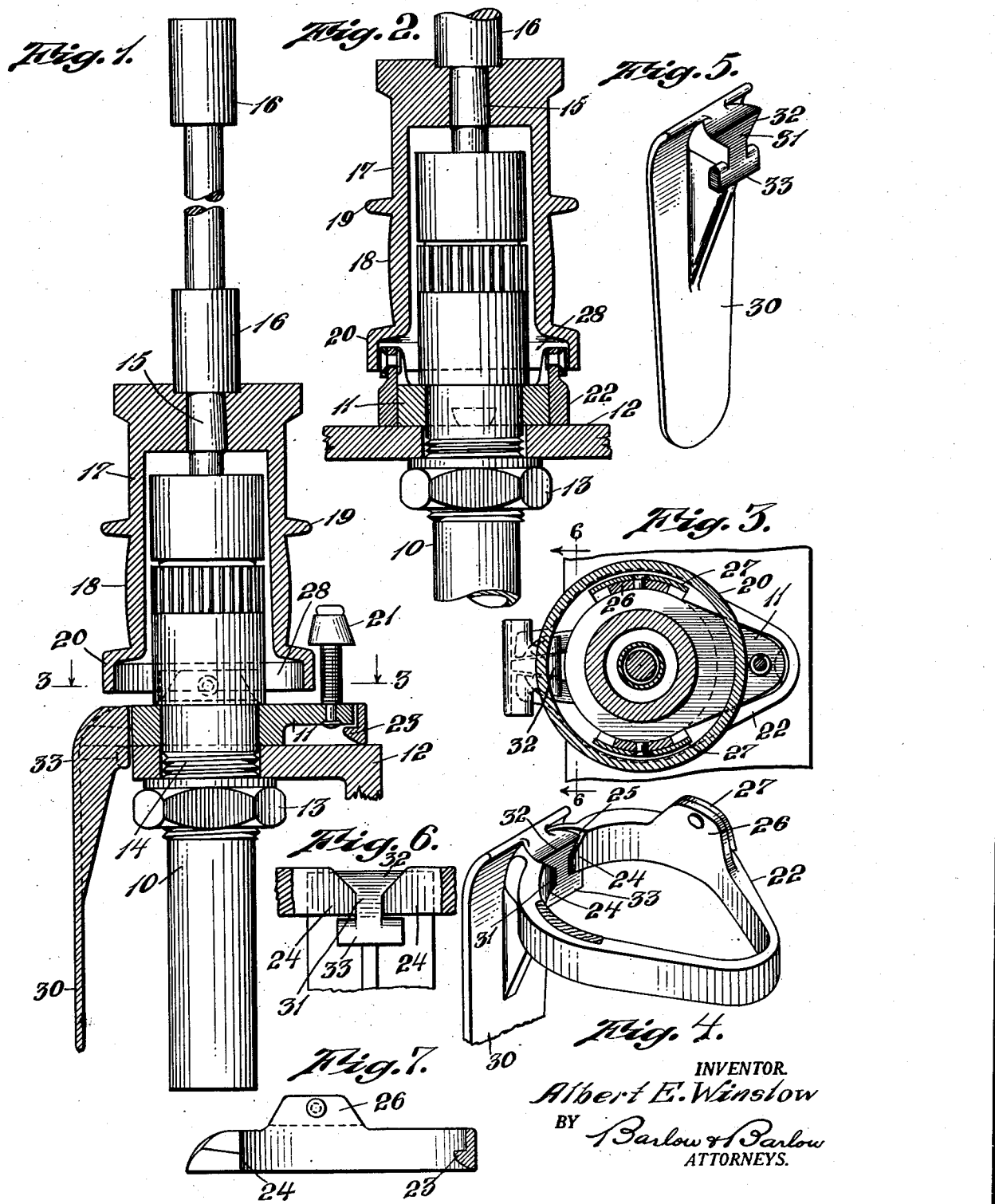

2,245,423

UNITED STATES PATENT OFFICE 2,245,423

BRAKE FOR SPINDLES

Albert E. Winslow, New London, Conn., assignor, by mesne assignments, to Atwood Machine Company, Stonington, Conn., a corporation of Connecticut Application May 11, 1940, Serial No. 334,666

3 Claims. (Cl. 57—88)

This invention relates to a brake for a spindle and has for one of its objects to provide a brake which may be applied to stop the rotation of the spindle and yet one in which the pressures upon the blade are so equalized that bending of the spindle blade by application of the brake is prevented.

Another object of the invention is to provide a brake which will be so positioned that it will not collect dirt or foreign matter but rather will be clean and always ready for use.

Another object of the invention is to provide a conveniently located and easy acting brake which may be applied by the knee of the operator.

With these and other objects in view, the invention consists of certain novel features of construction, as will be more fully described, and particularly pointed out in the appended claims.

In the accompanying drawing:

Fig. 1 is a sectional view of the spindle with my brake in position thereon;

Fig. 2 is a fragmental sectional view of the spindle taken at substantially right angles to the showing in Fig. 1;

Fig. 3 is a section on line 3—3 of Fig. 1;

Fig. 4 is a perspective view of the band with a fragmental portion and one brake shoe broken away and illustrating fragmentally the knee lever;

Fig. 5 is a perspective view of the knee lever alone;

Fig. 6 is a sectional view looking at the inside of the band and toward the knee lever; and Fig. 7 is a sectional view through the band alone.

In the operation of spindles it is frequently desirable to arrest the rotation of the spindle quickly, and a brake for this purpose is provided. Oftentimes these brakes apply pressure from one side of the spindle alone, and there is a tendency to bend or distort the blade of the spindle. In order to avoid any such tendency I have arranged a brake which will apply pressure in a balanced relation; also, I have so arranged the brake that it will apply pressure inside of the whorl, and accordingly the brake shoes will be kept clean and yet the action of this brake is by a knee lever so that the same may be very conveniently operated by the leg of the operator; and the following is a more detailed description of the present embodiment of this invention, illustrating the preferred means by which these advantageous results may be accomplished:

With reference to the drawing, 10 designates the casing of a spindle having a base 11 secured to the spindle rail 12 of the machine by means of nut 13 on the threaded portion 14 of the casing. A blade 15 extends upwardly from the spindle and is provided with package mounting bosses 16 thereon; also, there is provided a whorl 17 having a belt-driving surface 18 below the flange 19, and flange 20 with a depending lip at its lower edge which extends beneath the usual stop 21 mounted on the base.

The brake consists of a band 22 which fits about the spindle base 11 closely embracing the same. The band has a projection 23 extending beneath an overhanging portion of the base 11 so as to lock the band against rocking upwardly at this edge, while the ends of the band, 24, are spaced and each end portion is provided with a cam surface 25 flaring away from the band end as the surface proceeds inwardly from the outer surface of the band.

Ears 26 extend upwardly from the band into the downwardly projecting lip 20 of the whorl and are provided on their outer surfaces with brake shoes 27 which are of a character to engage the inside edge 28 of the whorl for applying a friction braking action thereon. A lever, shown in perspective in Fig. 5 and designated 30, is provided with an inward projection 31 which at its upper portion is substantially the reverse of the cam-shaped surfaces 25, thus providing generally V-shaped surfaces 32 for engagement with these cam surfaces 25.

Beneath this projection 31, there is a laterally-extending protuberance 33 which will engage with the base 11, or the rail just beneath the base, as shown in Fig. 1. This projection 33 engaging at this location serves as a fulcrum, and, when pressure is applied to the lower portion or free end of the lever 30, the lever will rock about this fulcrum 33 moving the upper end outwardly and causing the wedge-shaped projection 32 to engage the surfaces 25 and spread these surfaces, to thus spread or expand the band and move the brake shoes 27 outwardly into engagement with the inner surface 28 of the flange surface of the whorl and stop the spindle in its rotation.

By reason of the location of the brake shoes within the whorl they are free from lint and dirt which might otherwise accumulate upon parts of the machine and thus are always ready for an efficient action for braking when the knee lever is rocked, while at the same time equalizing braking pressure applied to the blade and preventing binding of the blade in arresting motion thereof.

The foregoing description is directed solely towards the construction illustrated, but I desire it to be understood that I reserve the privilege of resorting to all the mechanical changes to which the device is susceptible.

I claim:

1. In a spindle having a whorl with a downwardly extending lip, a brake comprising a plurality of symmetrically positioned brake shoes within said lip, a brake band upon which said shoes are mounted arranged to be moved to and from said lip about a fulcrum positioned at a location outwardly beyond the peripheral confines of said lip, and means to expand said band to cause said shoes to engage said lip.

2. In a spindle having a whorl with a braking surface on a rotary part thereof, a base outside of and below the whorl, a one-piece resilient brake band surrounding the base portion of said spindle and arranged to be movable circumferentially and radially relative to said base, brake shoes secured to said band and extending adjacent to said braking surface and means to flex said band to cause said shoes to be applied to said braking surface.

3. In a spindle having a whorl with a braking surface on a rotary part thereof, a base outside of the whorl provided with an undercut surface, a resilient band floatingly mounted about said base and provided with a projection thereon extending beneath said undercut surface, brake shoes secured to said band and extending into the whorl in close adjacency to said braking surface and means to expand said band to cause said shoes to be applied to said braking surface.

ALBERT E. WINSLOW.